United States Patent
Luo et al.

(10) Patent No.: US 12,409,941 B1
(45) Date of Patent: Sep. 9, 2025

(54) PARAMETER SETTING METHOD, DEVICE AND MULTI-ROTOR DRONE

(71) Applicant: SHENZHEN HOBBYWING TECHNOLOGY CO., LTD., Guangdong (CN)

(72) Inventors: Jianbin Luo, Guangdong (CN); Lei Xu, Guangdong (CN); Weiqing Zhong, Guangdong (CN); Youhui Liu, Guangdong (CN)

(73) Assignee: SHENZHEN HOBBYWING TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 19/192,582

(22) Filed: Apr. 29, 2025

Related U.S. Application Data

(63) Continuation of application No. PCT/CN2024/129456, filed on Nov. 1, 2024.

(30) Foreign Application Priority Data

Jun. 17, 2024 (CN) .......................... 202410779678.8

(51) Int. Cl.
*B64D 31/16* (2024.01)
*B64U 10/13* (2023.01)
(Continued)

(52) U.S. Cl.
CPC .............. *B64D 31/16* (2024.01); *B64U 10/13* (2023.01); *B64U 50/19* (2023.01); *H04L 12/40* (2013.01);
(Continued)

(58) Field of Classification Search
CPC ........ B64D 31/16; B64U 10/13; B64U 50/19; H04L 12/40; H04L 43/10; H04L 69/22; H04L 2012/40215; H04L 2012/4028
See application file for complete search history.

(56) References Cited

U.S. PATENT DOCUMENTS 3,367,110 A * 2/1968 Leeson, Jr. ............ B64D 31/12
60/702
4,098,242 A * 7/1978 Anderson ............... H02P 23/16
123/352
(Continued)

FOREIGN PATENT DOCUMENTS

| CN | 109309609 A | 2/2019 |
|---|---|---|
| CN | 115774456 A | 3/2023 |

(Continued)

*Primary Examiner* — Medhat Badawi

(57) ABSTRACT

Disclosed is a parameter setting method, device and multi-rotor drone. The method for a multi-rotor drone includes: acquiring identity information of all the ESCs; parsing parameter information of the ESCs according to the identity information, where the parameter information includes a common control parameter domain parameter and an independent control parameter domain parameter; acquiring the parameter information modified by the user; updating the common control parameter domain parameters of all the ESCs based on the modified common control parameter domain parameter; and updating the independent control parameter domain parameter of the target ESC based on the modified independent control parameter domain parameter. According to the method, the parameter information includes the common control parameter domain parameters and the independent control parameter domain parameters, and parameters are updated in different ways, thereby ensuring coordinated system-wide operations, and ensuring accuracy of parameter update.

12 Claims, 2 Drawing Sheets

(51) Int. Cl.
  *B64U 50/19* (2023.01)
  *H04L 12/40* (2006.01)
  *H04L 43/10* (2022.01)
  *H04L 69/22* (2022.01)

(52) U.S. Cl.
  CPC .... *H04L 43/10* (2013.01); *H04L 2012/40215* (2013.01); *H04L 2012/4028* (2013.01); *H04L 69/22* (2013.01)

(56) References Cited

U.S. PATENT DOCUMENTS

| | | | | |
|---|---|---|---|---|
| 4,740,898 A * | 4/1988 | McKee | B60K 31/047 | 701/99 |
| 4,915,072 A * | 4/1990 | Caron | F02D 35/0007 | 73/114.61 |
| 5,231,344 A * | 7/1993 | Marumoto | H02J 7/2434 | 322/14 |
| 5,265,644 A * | 11/1993 | Tuckey | F02M 37/08 | 137/557 |
| 5,394,851 A * | 3/1995 | Cryer | F02D 41/40 | 123/506 |
| 5,749,344 A * | 5/1998 | Yoshiume | F02D 41/3082 | 123/497 |
| 5,771,861 A * | 6/1998 | Musser | F02D 41/1401 | 123/357 |
| 5,886,422 A * | 3/1999 | Mills | H02P 5/60 | 307/29 |
| 6,031,749 A * | 2/2000 | Covington | H05B 47/165 | 363/132 |
| 6,133,643 A * | 10/2000 | Lukich | F02D 31/007 | 290/51 |
| 6,194,792 B1 * | 2/2001 | Yanou | B62D 5/0457 | 307/9.1 |
| 6,240,902 B1 * | 6/2001 | Tanaka | F02D 41/3082 | 123/456 |
| 6,279,541 B1 * | 8/2001 | Doane | F02M 69/54 | 123/514 |
| 6,330,873 B1 * | 12/2001 | Letang | B60K 31/047 | 180/170 |
| 6,334,085 B1 * | 12/2001 | Kawamura | G01M 15/046 | 701/115 |
| 6,456,908 B1 * | 9/2002 | Kumar | B60L 3/0023 | 701/19 |
| 6,465,908 B1 * | 10/2002 | Karuppana | H02J 4/00 | 307/31 |
| 6,507,505 B2 * | 1/2003 | Oka | H02M 1/12 | 363/47 |
| 6,532,941 B2 * | 3/2003 | Begley | F02D 41/3845 | 123/514 |
| 6,609,501 B2 * | 8/2003 | Doane | F02D 41/3082 | 123/497 |
| 6,622,707 B2 * | 9/2003 | Begley | F02M 69/462 | 123/514 |
| 6,665,601 B1 * | 12/2003 | Nielsen | H04L 12/40 | 710/60 |
| 6,775,163 B2 * | 8/2004 | McDonald | H02M 3/33561 | 363/142 |
| 6,807,949 B2 * | 10/2004 | Kishibata | F02P 1/08 | 123/406.47 |
| 6,809,678 B2 * | 10/2004 | Vera | H02J 1/102 | 323/299 |
| 6,819,012 B1 * | 11/2004 | Gabrys | H02J 9/066 | 307/68 |
| 6,877,488 B2 * | 4/2005 | Washeleski | F02M 25/08 | 123/41.31 |
| 6,885,166 B2 * | 4/2005 | Eisenhardt | H02P 21/0021 | 318/434 |
| 6,903,537 B2 * | 6/2005 | Tzeng | H02M 3/156 | 323/268 |
| 6,957,136 B2 * | 10/2005 | Tachibana | G11C 16/102 | 711/155 |
| 6,979,916 B2 * | 12/2005 | Schienbein | H02M 7/49 | 307/82 |
| 7,023,672 B2 * | 4/2006 | Goodfellow | H02M 3/1584 | 361/111 |
| 7,506,309 B2 * | 3/2009 | Schaefer | G07C 5/008 | 701/31.4 |
| 8,290,659 B2 * | 10/2012 | Asano | G06F 8/64 | 701/34.2 |
| 8,306,521 B2 * | 11/2012 | Ban | G06F 21/572 | 455/418 |
| 8,397,228 B2 * | 3/2013 | Matlin | G06F 8/65 | 717/173 |
| 9,198,344 B2 * | 12/2015 | Prickel | A01B 71/02 | |
| 10,764,752 B1 * | 9/2020 | Avetisov | H04L 63/0823 | |
| 10,825,266 B2 * | 11/2020 | Srinivasan | H04W 4/44 | |
| 11,200,319 B2 * | 12/2021 | Jain | H04L 41/0806 | |
| 11,636,716 B2 * | 4/2023 | Srinivasan | F02D 41/26 | 709/217 |
| 11,847,211 B2 * | 12/2023 | Juliato | G06F 21/85 | |
| 2005/0102669 A1 * | 5/2005 | Marney | G06F 11/1004 | 717/174 |
| 2005/0256614 A1 * | 11/2005 | Habermas | B60L 3/0023 | 701/1 |
| 2005/0284448 A1 * | 12/2005 | Forgue | F02D 33/006 | 123/497 |
| 2007/0084444 A1 * | 4/2007 | Bellistri | F02M 51/0671 | 123/480 |
| 2007/0137620 A1 * | 6/2007 | Couch | F02D 41/20 | 361/152 |
| 2007/0185624 A1 * | 8/2007 | Duddles | G06F 8/654 | 701/1 |
| 2009/0077263 A1 * | 3/2009 | Koganti | H04L 67/1095 | 709/248 |
| 2009/0204308 A1 * | 8/2009 | Manan | F02D 31/001 | 701/115 |
| 2011/0282495 A1 * | 11/2011 | Fischer | B60N 2/0224 | 709/204 |
| 2015/0309784 A1 * | 10/2015 | Molin | F01N 9/002 | 701/1 |
| 2016/0196131 A1 * | 7/2016 | Searle | H04L 41/082 | 717/173 |
| 2017/0039372 A1 * | 2/2017 | Koval | H04L 67/06 | |
| 2018/0017962 A1 * | 1/2018 | Miller | B60W 30/00 | |
| 2018/0152341 A1 * | 5/2018 | Maeda | H04L 41/082 | |
| 2018/0198846 A1 * | 7/2018 | Srinivasan | H04L 63/083 | |
| 2018/0285840 A1 * | 10/2018 | Hasan | G06Q 50/01 | |
| 2018/0356823 A1 * | 12/2018 | Cooper | G06Q 50/40 | |
| 2019/0102874 A1 * | 4/2019 | Goja | G06Q 10/00 | |
| 2019/0220990 A1 * | 7/2019 | Goja | G06T 7/13 | |
| 2021/0044976 A1 * | 2/2021 | Avetisov | H04W 12/08 | |
| 2023/0367833 A1 * | 11/2023 | Kol | G06F 16/958 | |
| 2025/0045417 A1 * | 2/2025 | Wen | G06F 21/552 | |
| 2025/0077725 A1 * | 3/2025 | Shi | G06F 30/17 | |
| 2025/0109876 A1 * | 4/2025 | Risbeck | F24F 11/64 | |

FOREIGN PATENT DOCUMENTS

| | | |
|---|---|---|
| CN | 118100734 A | 5/2024 |
| CN | 118605590 A | 9/2024 |

\* cited by examiner

PARAMETER SETTING METHOD, DEVICE AND MULTI-ROTOR DRONE

CROSS REFERENCE TO RELATED APPLICATIONS

This application is a bypass continuation application of PCT application no.: PCT/CN2024/129456. The present application claims the priorities from PCT Application PCT/CN2024/129456, filed Nov. 1, 2024, and from Chinese patent with the Application No. 202410779678.8 filed with China National Intellectual Property Administration on Jun. 17, 2024, and entitled "Parameter Setting Method, Device and Multi-rotor Drone", which is incorporated in its entirety herein by reference.

TECHNICAL FIELD

The present disclosure relates to the technical field of drone control, and specifically relates to a parameter setting method, device and multi-rotor drone.

BACKGROUND

In systems of a multi-rotor drone, a power system of the drone and a flight control system (also known as a flight controller) that controls a flight attitude of the drone are important components of the drone. The flight controller controls motors and propellers in the power system through an electronic speed controller (ESC) to achieve flight and attitude adjustment. Consequently, a corresponding power system is usually designed to achieve stable flight of the multi-rotor drone. For example, if a 6-rotor drone weighs 30 KG, a power system usually needs to provide a thrust equivalent to approximately twice a total weight of the drone, and each rotor needs to provide a thrust of about 10 KG. On this basis, in case of changes in an overall design of the drone system, such as changes in the number of rotors or a weight of the drone, existing designs maybe cannot meet needs of overall drone control, which may result in phenomena such as failure to fly due to too large/too small thrust, flight attitude anomaly caused by too slow/fast response, or even catastrophic crashes, and the like, thereby causing significant safety risks.

SUMMARY

Embodiments of the present disclosure are intended to mainly solve the technical problem of significant safety risks in an overall design of a multi-rotor drone system of the prior art.

In a first aspect, in an example of the present disclosure, a parameter setting method is provided, which is applied to a multi-rotor drone, where the multi-rotor drone includes a parameter adjustment system and a plurality of electronic speed controllers (ESCs), and the parameter adjustment system is in communication connection with the plurality of ESCs. The method includes:
  acquiring identity information of all the ESCs;
  parsing parameter information of the ESCs according to the identity information to enable a user to modify parameter information of a target ESC according to the identity information, where the parameter information includes a common control parameter domain parameter and an independent control parameter domain parameter;
  acquiring the common control parameter domain parameter and the independent control parameter domain parameter of the target ESC modified by the user;
  updating the common control parameter domain parameters of all the ESCs based on the modified common control parameter domain parameter; and
  updating the independent control parameter domain parameter of the target ESC based on the modified independent control parameter domain parameter.

In some examples, the parameter adjustment system and all the ESCs are connected to a same CAN bus network, and the acquiring identity information of all the ESCs includes:
  sending a heartbeat packet query instruction to all the ESCs through the CAN bus network, to delay transmission of the heartbeat packet to the parameter adjustment system through the CAN bus network after the ESCs receive the heartbeat packet query instruction; and
  parsing the heartbeat packet through the parameter adjustment system to acquire the identity information of all the ESCs, where the identity information includes addresses of the ESCs.

In some examples, the delaying transmission of the heartbeat packet to the parameter adjustment system through the CAN bus network after the ESCs receive the heartbeat packet query instruction further includes:
  determining preset delay time T according to an address of the ESC; and
  transmitting the heartbeat packet to the parameter adjustment system after the preset delay time T upon receiving the heartbeat packet query instruction.

In some examples, the preset delay time T corresponding to each of the ESCs at least meets the following requirements:

$$\text{Preset time}(T) \geq \text{Address size} \times \frac{\text{Transmitted byte count} \times 8 \text{ bit}}{\text{Communication rate}} + \text{System commnication response delay},$$

where an address size is determined based on the address of the ESC.

In some examples, the parsing parameter information of the ESCs according to the identity information includes:
  acquiring and parsing the common control parameter domain parameter of the ESC through point-to-point communication according to an address of any ESC; and
  acquiring the independent control parameter domain parameters of all the ESCs through point-to-point polling communication according to the addresses of all the ESCs.

In some examples, the parameter adjustment system includes an interactive assembly, and the interactive assembly is configured to display addresses and corresponding parameter information of the ESCs and respond to a user interaction, where the user interaction includes modifying the parameter information of the target ESC according to the address of the target ESC.

In some examples, the updating the common control parameter domain parameters of all the ESCs based on the modified common control parameter domain parameter includes:
  publishing the modified common control parameter domain parameter on the CAN bus network through broadcast communication, such that all the ESCs acquire and store the modified common control parameter domain parameters through the CAN bus network.

In some examples, the updating the independent control parameter domain parameter of the target ESC based on the modified independent control parameter domain parameter includes:

performing point-to-point polling communication between the modified independent control parameter domain parameter and the address of the target ESC to write the independent control parameter domain parameter into the target ESC corresponding to the address, so as to store the corresponding independent control parameter domain parameter in the target ESC.

In a second aspect, in an example of the present disclosure, a parameter setting device is further provided, which is applied to a multi-rotor drone, where the multi-rotor drone includes a parameter adjustment system and a plurality of ESCs, and the parameter adjustment system is in communication connection with the plurality of ESCs. The device includes:

an ESC identification module, configured for acquiring identity information of all the ESCs;

an address parsing module, configured for parsing parameter information of the ESCs according to the identity information to enable a user to modify parameter information of a target ESC according to the identity information, where the parameter information includes a common control parameter domain parameter and an independent control parameter domain parameter;

a parameter modification module, configured for acquiring the common control parameter domain parameter and the independent control parameter domain parameter of the target ESC modified by the user;

a first parameter setting module, configured for updating the common control parameter domain parameters of all the ESCs based on the modified common control parameter domain parameter; and a second parameter setting module, configured for updating the independent control parameter domain parameter of the target ESC based on the modified independent control parameter domain parameter.

In a third aspect, a multi-rotor drone is further provided in an example of the present disclosure, including:

at least one processor and memory; and the memory is coupled to the processor, the memory is configured to store instructions or programs, and when the instructions or programs are executed by at least one processor, the at least one processor executes the above parameter setting method.

In a fourth aspect, a non-volatile computer-readable storage medium is further provided in an example of the present disclosure, the computer-readable storage medium stores computer-executable instructions, and when the computer-executable instructions are executed by an electronic device, the electronic device executes the above parameter setting method.

In a fifth aspect, a computer program product is further provided in an example of the present disclosure, the computer program product includes a computer program stored on a non-volatile computer-readable storage medium, the computer program includes program instructions, and when the program instructions are executed by an electronic device, the electronic device executes the above parameter setting method.

The parameter setting method, device and multi-rotor drone are provided in examples of the present disclosure. The method includes: acquiring identity information of all the ESCs; parsing parameter information of the ESCs according to the identity information to enable a user to modify parameter information of a target ESC according to the identity information, where the parameter information includes a common control parameter domain parameter and an independent control parameter domain parameter; acquiring the common control parameter domain parameter and the independent control parameter domain parameter of the target ESC modified by the user; updating the common control parameter domain parameters of all the ESCs based on the modified common control parameter domain parameter; and updating the independent control parameter domain parameter of the target ESC based on the modified independent control parameter domain parameter. According to the method, the parameter information of the ESC includes the common control parameter domain parameters and the independent control parameter domain parameters, and the modified common control parameter domain parameter is published through broadcast communication, thereby ensuring coordinated system-wide operations based on the latest common control parameter domain parameter, improving system communication efficiency, and simplifying a parameter update process; and the modified independent control parameter domain parameter is directly written into the target ESC corresponding to the address through a point-to-point polling communication strategy, thereby ensuring accuracy of parameter update and uniqueness of a target device, and enhancing system flexibility and configurability.

BRIEF DESCRIPTION OF THE DRAWINGS

One or more examples are exemplarily described by drawings in corresponding accompanying drawings, and such exemplary description does not constitute a limitation on the embodiments. Elements with the same reference numerals in the accompanying drawings are shown as similar elements, and the drawings in the accompanying drawings do not constitute a scale limitation unless otherwise stated.

DETAILED DESCRIPTIONS OF THE EMBODIMENTS

In order to make the objectives, technical solutions and advantages of the present disclosure clearer, the present disclosure will be described in further detail below in conjunction with the accompanying drawings and examples. It is to be understood that the specific examples described herein are merely illustrative of the present disclosure and are not intended to limit the present disclosure.

It is to be noted that various features in the examples of the present disclosure may be combined without conflicts, and all fall within the protection scope of the present disclosure. Additionally, functional module divisions are illustrated in a schematic diagram of device, and a logical sequence is shown in a flowchart, but in certain cases, the steps shown or described may be executed based on module divisions different from those in the schematic diagram of device or the logical sequence shown in the flowchart.

Unless defined otherwise, all technical and scientific terms used in the specification have the same meaning as commonly understood by those skilled in the art to which the present disclosure belongs. The terms used in the specification of the present disclosure is for the purpose of describing specific embodiments merely and is not intended to limit the present disclosure. The term "and/or" as used in the specification includes any or all combinations of one or more of the associated listed items.

In order to ensure stable flight of a multi-rotor drone, a parameter adjustment system and an electronic speed controller (ESC) are usually configured to adjust flight control parameters so as to adapt to a customized power system. Changes in an overall design of the drone necessitate re-customization of a power system, to avoid flight problems caused by any insufficient thrust or abnormal response. On this basis, a parameter setting method is provided in an example of the present disclosure, which is applied to a multi-rotor drone, where the multi-rotor drone includes a parameter adjustment system and a plurality of ESCs, and the parameter adjustment system is in communication connection with the plurality of ESCs. Generally, each ESC is connected to a motor, and the parameter adjustment system is configured to adjust the motors through the ESCs. The number of the ESCs in the multi-rotor drone is identical to the number of rotors of the drone. For example, a small four-rotor drone usually is provided with four ESCs and four motors. The ESCs control rotational speeds of the motors through received PWM signals, which enables to adjust a flight attitude of the drone.

Figure 1:
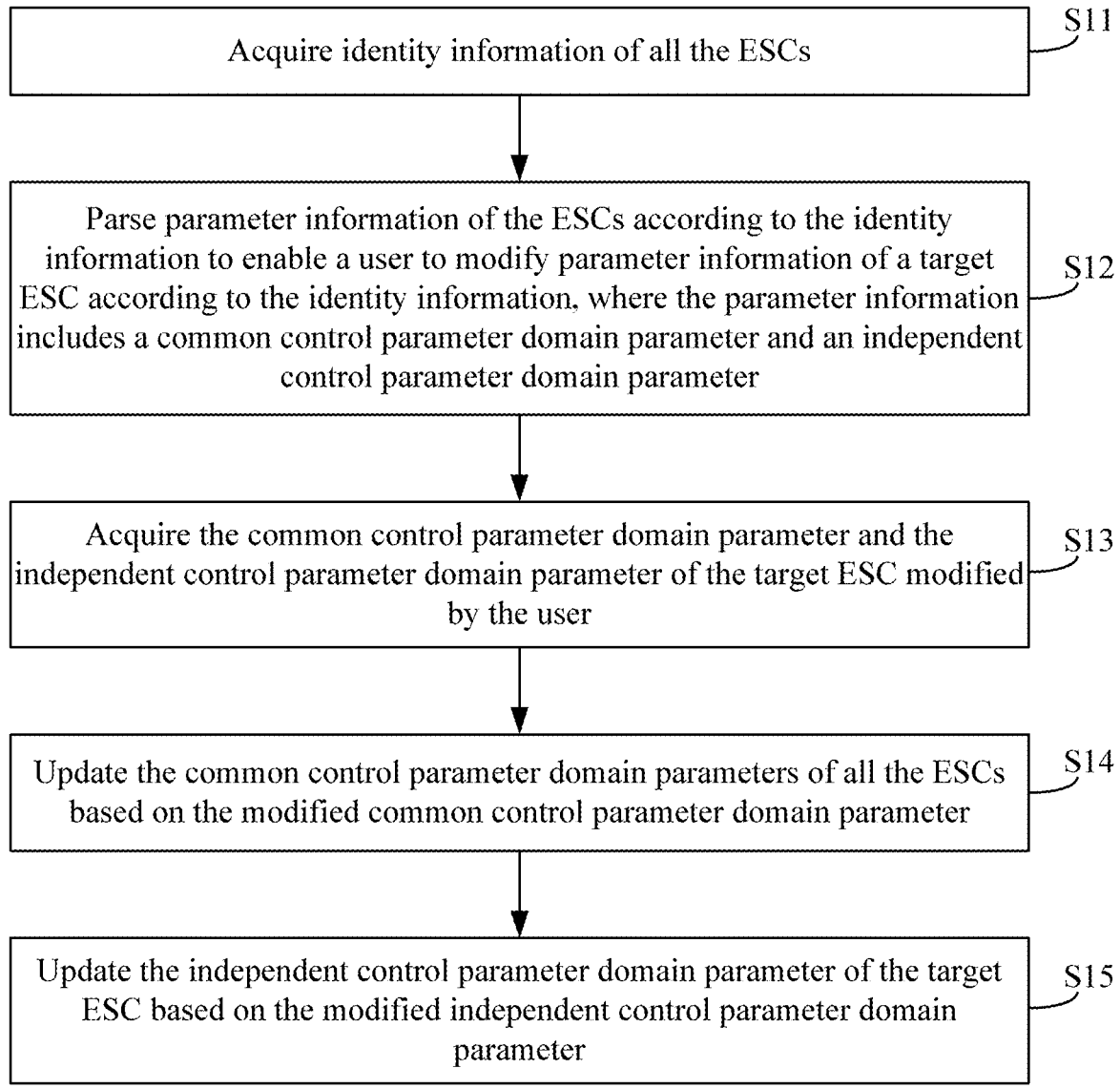
FIG. 1 is a schematic flowchart of a parameter setting method provided in an example of the present disclosure.

With reference to FIG. 1, the parameter setting method provided in an example of the present disclosure includes:

S11, acquire identity information of all the ESCs.

In an example of the present disclosure, the parameter adjustment system and all the ESCs of the multi-rotor drone are connected to a same CAN bus network, data interactions with each ESC based on CAN communication are achieved through the CAN bus network, each ESC as a node in the bus network is assigned with an identity-specific address, and broadcast messages (broadcast frames) or address-specific messages (unicast frames) are transmitted in the bus network through a host. For example, when the host sends a broadcast message, all nodes (ESCs) in the CAN bus network receive the broadcast message; and when the host transmits an address-specific message, such as a point-to-point addressed data frame sent through an identity-specific address of a target node, only the ESC corresponding to the address-specific message receives the address-specific message. In an example of the present disclosure, the parameter adjustment system serves as a host of the CAN bus network, and in some other examples, another control device is alternatively configured as the host.

Specifically, the parameter adjustment system sends a heartbeat packet query instruction to all the ESCs through the CAN bus network in a way of transmitting broadcast messages. Upon receiving the instruction, each node of the CAN network bus, that is, each of the ESCs, transmits a heartbeat packet to the parameter adjustment system after preset delay time, then the parameter adjustment system parses data of the heartbeat packet, and the data usually includes identity information of the ESC that sends the heartbeat packet, such as an address of the ESC. The parameter adjustment system identifies a target ESC that sends the heartbeat packet according to the data of the heartbeat packet. In some other examples, the identity information further includes a unique identifier, and the parameter adjustment system (or the host) further distinguishes different ESCs through the unique identifier.

It is to be understood that when a plurality of devices send data to a bus simultaneously or almost simultaneously, a "frame collision" phenomenon maybe occurs, that is, a plurality of data packets (such as the heartbeat packets in this solution) conflict on the bus, which results in data damage or loss. On this basis, in an example of the present disclosure, when an ESC receives a heartbeat packet query instruction, a heartbeat packet is transmitted to the parameter adjustment system after preset delay time T. The ESC determines the preset delay time T according to its own address, to reduce the likelihood of frame collision or frame loss on the bus.

In an example of the present disclosure, the preset delay time T at least meets the following requirements:

$$\text{Preset time}(T) \geq \text{Address size} \times \frac{\text{Transmitted byte count} \times 8 \text{ bit}}{\text{Communication rate}} +$$

$$\text{System commnication response delay},$$

where an address size is determined based on the address of the ESC, and therefore the preset delay time T corresponding to each ESC maybe differs. It is to be understood that excessively long preset delay time T maybe reduces communication efficiency. Therefore, in practical applications, relatively appropriate preset delay time T is empirically determined according to specific system scenarios and requirements on the premise of meeting the above requirements, and alternatively appropriate preset delay time T is determined through testing and experiments.

S12, parse parameter information of the ESCs according to the identity information to enable a user to modify parameter information of a target ESC according to the identity information, where the parameter information includes a common control parameter domain parameter and an independent control parameter domain parameter.

In an example of the present disclosure, a control parameter domain of the ESC includes a common control parameter domain and an independent control parameter domain. Accordingly, parameter information of the ESC correspondingly includes a common control parameter domain parameter and an independent control parameter domain parameter. The common control parameter domain refers to a combination of parameters that are universally applicable to all or most ESCs and need to be uniformly configured and managed, such as thrust-related parameters, response-related parameters, and other parameters related to basic operation and safety of system. The independent control parameter domain refers to a combination of parameters that maybe vary for different ESCs and need to be configured and managed separately, such as steering parameters (turning left on one side and turning right on the other side), light color parameters (different light color requirements for different rotors of the drone), and other parameters related to specific functions or optimization of the device.

After the parameter adjustment system receives all heartbeat packets in the CAN bus network, addresses of all the ESCs are parsed according to these heartbeat packets. Since the common control parameter domain parameters of all the ESCs are identical, the common control parameter domain parameter of the ESC is acquired and parsed through point-to-point communication according to an address of any ESC in an example of the present disclosure. The independent control parameter domain parameters of different ESCs maybe vary, and therefore, in an example of the present disclosure, the independent control parameter domain parameters of all the ESCs are acquired through point-to-point polling communication according to the addresses of all the ESCs. Therefore, the parameter adjustment system acquires the addresses of all the ESCs according to the heartbeat packets, and further acquires parameter information of each of the ESCs according to the corresponding address.

The approach enables the user to accurately adjust a parameter of a target ESC according to an address thereof, and parameter information of the ESC includes a common control parameter domain parameter and an independent control parameter domain parameter. In order to achieve accurate acquisition of parameter information, point-to-point communication is employed to acquire the common control parameter domain parameter by specifying an address of any ESC, or polling communication is performed to acquire a corresponding independent control parameter domain parameter by establishing a connection with each ESC one by one, which ensures accuracy and flexibility of parameter management.

S13, acquire the common control parameter domain parameter and the independent control parameter domain parameter of the target ESC modified by the user.

In an example of the present disclosure, the parameter adjustment system includes an interactive assembly, and the interactive assembly is configured to display addresses and corresponding parameter information of the ESCs, namely the addresses, common control parameter domain parameters and independent control parameter domain parameters of all the ESCs parsed in the above S12, which facilitates user viewing. The interactive assembly also responds to a user interaction, where the user interaction includes modifying the parameter information of the target ESC according to the address of the target ESC, and the parameter information includes a common control parameter domain parameter and an independent control parameter domain parameter, which facilitates modification by the user.

Specifically, in some examples, the interactive assembly is alternatively a remote controller, an address and parameter information of the ESC are displayed through a display screen of the remote controller, and the user is allowed to modify relevant parameters through a button, switch and joystick on the remote controller. In other examples, the interactive assembly is alternatively a device hosting programs. For example, some customized drones allow the user to adjust relevant parameters through a control program running on a computer. The user enters a parameter setting interface through the control program, selects a target parameter, and makes corresponding modifications. In this case, the user is usually required to possess certain specialized knowledge and technical expertise. For another example, the manufacturer of a consumer-grade drone maybe provides a mobile APP for parameter adjustment of the drone, and the user is allowed to modify relevant parameters after accessing the drone through the mobile APP. In some other examples, the interactive assembly is alternatively a touch screen. For example, the drone is provided with a touch screen as an auxiliary operating interface, and the user is allowed to intuitively view and modify relevant parameters of the drone through the touch screen. It is to be understood that the above examples of various interactive assemblies for illustrative purposes only and do not represent limitations thereto.

The user modifies parameter information of a target ESC through the interactive assembly. Depending on practical application scenarios, the target ESC refers to all ESCs in the CAN bus network, or some of the ESCs, or one of the ESCs. The user is allowed to modify a common control parameter domain parameter and/or an independent control parameter domain parameter of the target ESC, where the common control parameter domain parameters of all the target ESCs are modified in a same manner as suggested.

S14, update the common control parameter domain parameters of all the ESCs based on the modified common control parameter domain parameter.

When the user modifies the parameter information of the target ESC, the parameter adjustment system acquires the modified common control parameter domain parameter through the interactive assembly. Because the common control parameter domain parameters of the ESCs need to remain consistent, the modified common control parameter domain parameters are published on the CAN bus network through broadcast communication in an example of the present disclosure, such that all the ESCs acquire and store the modified common control parameter domain parameters through the CAN bus network.

The approach enables to publish modified parameters in the CAN bus network through broadcast communication, and all ESCs as nodes connected to the CAN bus network receive and store the updated parameters, to ensure system-wide coordinated operations based on the latest common control parameter domain parameters, thereby improving communication efficiency and reliability of system, and simplifying a parameter update process.

S15, update the independent control parameter domain parameter of the target ESC based on the modified independent control parameter domain parameter.

When the user modifies the parameter information of the target ESC, the parameter adjustment system acquires the modified independent control parameter domain parameter through the interactive assembly. The independent control parameter domain parameters of different ESCs maybe vary, and therefore, in an example of the present disclosure, point-to-point polling communication between the modified independent control parameter domain parameter and the address of the target ESC is performed to write the independent control parameter domain parameter into the target ESC corresponding to the address, so as to store the corresponding independent control parameter domain parameter in the target ESC.

The approach enables to match the modified independent control parameter domain parameter with the address of the target ESC, and the modified parameter is directly written into the target ESC corresponding to the address through the point-to-point polling communication strategy, thereby ensuring accuracy of parameter update and uniqueness of the target device, and avoiding possible data conflicts associated with broadcast communication. Through the approach, the target ESC stores and applies the latest independent control parameter domain parameters, which achieves precise control over specific devices (such as motors), and enhances system flexibility and configurability.

A parameter setting method for a multi-rotor drone is provided in an example of the present disclosure. The method includes: acquire identity information of all the ESCs; parse parameter information of the ESCs according to the identity information to enable a user to modify parameter information of a target ESC according to the identity information, where the parameter information includes a common control parameter domain parameter and an independent control parameter domain parameter; acquire the common control parameter domain parameter and the independent control parameter domain parameter of the target ESC modified by the user; update the common control parameter domain parameters of all the ESCs based on the modified common control parameter domain parameter; and update the independent control parameter domain parameter of the target ESC based on the modified independent control parameter domain parameter. According to the method, the parameter information of the ESC includes the common control parameter domain parameters and the independent control parameter domain parameters, and the modified common control parameter domain parameter is published through broadcast communication, thereby ensuring coordinated system-wide operations based on the latest common control parameter domain parameter, improving system communication efficiency, and simplifying a parameter update process; and the modified independent control parameter domain parameter is directly written into the target ESC corresponding to the address through a point-to-point polling communication strategy, thereby ensuring accuracy of parameter update and uniqueness of a target device, and enhancing system flexibility and configurability.

Figure 2:
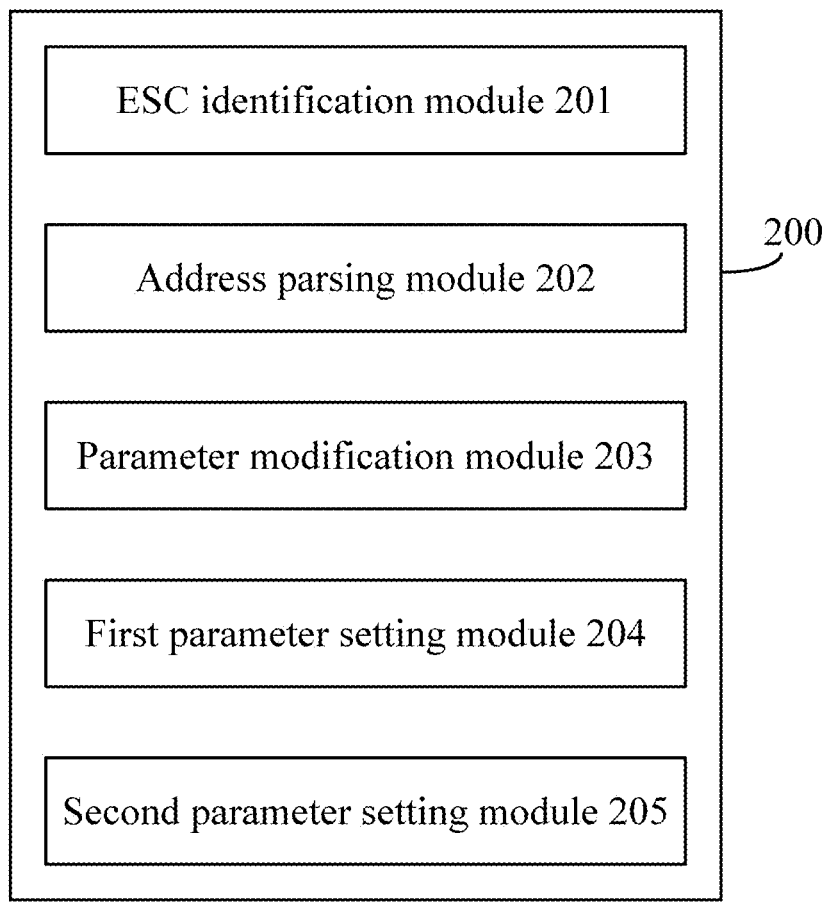
FIG. 2 is a structural schematic diagram of a parameter setting device provided in an example of the present disclosure.

In an example of the present disclosure, a parameter setting device is provided, which is applied to a multi-rotor drone, where the multi-rotor drone includes a parameter adjustment system and a plurality of ESCs, and the parameter adjustment system is in communication connection with the plurality of ESCs. With reference to FIG. 2, the parameter setting device 200 includes: an ESC identification module 201, an address parsing module 202, a parameter modification module 203, a first parameter setting module 204, and a second parameter setting module 205.

Specifically, the ESC identification module 201 is configured for acquiring identity information of all the ESCs; the address parsing module 202 is configured for parsing parameter information of the ESCs according to the identity information to enable a user to modify parameter information of a target ESC according to the identity information, where the parameter information includes a common control parameter domain parameter and an independent control parameter domain parameter; the parameter modification module 203 is configured for acquiring the common control parameter domain parameter and the independent control parameter domain parameter of the target ESC modified by the user; the first parameter setting module 204 is configured for updating the common control parameter domain parameters of all the ESCs based on the modified common control parameter domain parameter; and the second parameter setting module 205 is configured for updating the independent control parameter domain parameter of the target ESC based on the modified independent control parameter domain parameter.

It is to be noted that the above parameter setting device executes the parameter setting method provided in an example of the present disclosure, and has corresponding functional modules and beneficial effects for execution of the method. For technical details not exhaustively described in an example of the parameter setting device, please refer to the parameter setting method provided in an example of the present disclosure.

Figure 3:
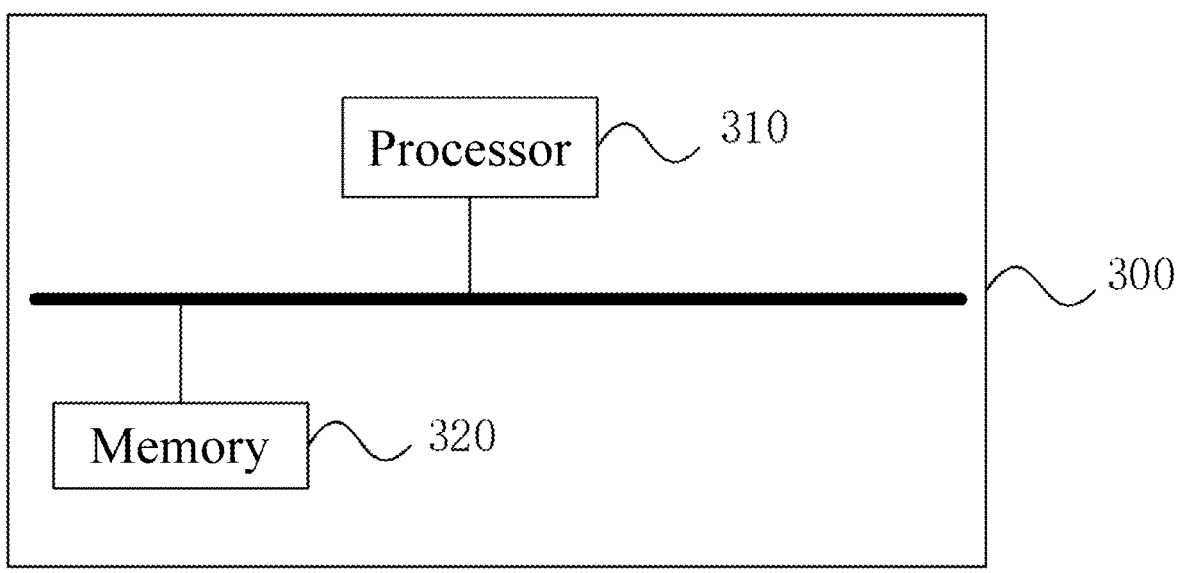
FIG. 3 is a structural schematic diagram of a multi-rotor drone provided in an example of the present disclosure.

A multi-rotor drone is provided in an example of the present disclosure, as illustrated in FIG. 3, and the multi-rotor drone includes: one or more processors 310 and a memory 320. FIG. 3 takes one processor 310 as an example.

The processor 310 and the memory 320 are connected through a bus or other means, and FIG. 3 takes bus connection as an example.

The memory 320 is a non-volatile computer-readable storage medium used to store non-volatile software programs, non-volatile computer-executable programs and modules, such as program instructions/modules corresponding to the parameter setting method in an example of the present disclosure. The processor 310 executes various functional applications and data processing of a solid state drive by running the non-volatile software programs, instructions and modules stored in the memory 320, to implement the parameter setting method described in the above method examples.

The memory 320 includes a program storage area and a data storage area, where an operating system and at least one application program necessary for functionality are stored in the program storage area. Further, the memory 320 is a high-speed random access memory or a non-volatile memory, such as at least one disk storage device, a flash memory device, or any other non-volatile solid-state storage device. In some examples, the memory 320 optionally includes a memory remotely arranged relative to the processor 310.

The one or more modules are stored in the memory 320, and when executed by the one or more processors 310, the parameter setting method in any of the above method examples is implemented, e.g., method steps in FIG. 1 described above are executed.

The device examples described above are merely schematic, the module described as a separable component may be physically separated or not, and a component shown as a module may be a physical module or not, that is, may be located at one place or may also be distributed on a plurality of network modules. Part or all of the modules may be selected according to actual needs to achieve the objective of the solution of the examples of the present disclosure.

A computer storage medium is further provided in an example of the present disclosure, instructions or programs are stored in the computer storage medium, and when the instructions or programs are executed by at least one processor, the at least one processor executes the parameter setting method described in the above method examples.

The above product executes the parameter setting method provided in an example of the present disclosure, and has corresponding functional modules for execution of the method. For technical details not exhaustively described in this example, please refer to the parameter setting method provided in an example of the present disclosure.

Through the description of the above embodiments, those skilled in the art clearly understand that the embodiments may be implemented by using software in combination with a general-purpose hardware platform, and may also be implemented through hardware. Those of ordinary skill in the art may understand that all or some procedures in the methods implementing the above examples may be completed by a computer program instructing related hardware. The program may be stored in one computer-readable storage medium, and the program may include the procedures of examples of each method above when executed. The above storage medium is a magnetic disk, an optical disk, a read-only memory (ROM), or a random access memory (RAM).

Finally, it is to be noted that: the above examples are only used to illustrate the technical solutions of the present disclosure, but not to limit same; under the inventive concepts of the present disclosure, technical features in the above examples or different examples may be combined, steps may be executed in any order, and many other variations in various aspects of the present disclosure as described above are not provided in detail for the sake of brevity; and although the present disclosure has been described in detail with reference to the foregoing examples, it is to be understood by those ordinarily skilled in the art that: the technical solutions described in the foregoing examples can still be modified, or some technical features thereof can be equivalently replaced; and these modifications or replacements do not make the essence of the corresponding technical solutions deviate from the scope of the technical solutions of the examples of the present disclosure.

What is claimed is:

1. A parameter setting method, applied to a multi-rotor drone, wherein the multi-rotor drone comprises a parameter adjustment system and a plurality of electronic speed controllers (ESCs), the parameter adjustment system is in communication connection with the plurality of ESCs, and the method comprises:
   acquiring identity information of all the ESCs;
   parsing parameter information of the ESCs according to the identity information to enable a user to modify parameter information of a target ESC according to the identity information, wherein the parameter information comprises a common control parameter domain parameter and an independent control parameter domain parameter;
   acquiring the common control parameter domain parameter and the independent control parameter domain parameter of the target ESC modified by the user;
   updating the common control parameter domain parameters of all the ESCs based on the modified common control parameter domain parameter; and
   updating the independent control parameter domain parameter of the target ESC based on the modified independent control parameter domain parameter.

2. The method according to claim 1, wherein the parameter adjustment system and all the ESCs are connected to a same CAN bus network, and the acquiring identity information of all the ESCs comprises:
   sending a heartbeat packet query instruction to all the ESCs through the CAN bus network, to delay transmission of the heartbeat packet to the parameter adjustment system through the CAN bus network after the ESCs receive the heartbeat packet query instruction; and
   parsing the heartbeat packet through the parameter adjustment system to acquire the identity information of all the ESCs, wherein the identity information comprises addresses of the ESCs.

3. The method according to claim 2, wherein the delaying transmission of the heartbeat packet to the parameter adjustment system through the CAN bus network after the ESCs receive the heartbeat packet query instruction further comprises:
   determining preset delay time T according to an address of the ESC; and
   transmitting the heartbeat packet to the parameter adjustment system after the preset delay time T upon receiving the heartbeat packet query instruction.

4. The method according to claim 3, wherein the preset delay time T corresponding to each of the ESCs at least meets the following requirements:

$$\text{Preset time}(T) \geq \text{Address size} \times \frac{\text{Transmitted byte count} \times 8 \text{ bit}}{\text{Communication rate}} + \text{System commnication response delay},$$

in the formula, an address size is determined based on the address of the ESC.

5. The method according to claim 2, wherein the parsing parameter information of the ESCs according to the identity information comprises:
   acquiring and parsing the common control parameter domain parameter of the ESC through point-to-point communication according to an address of any ESC; and
   acquiring the independent control parameter domain parameters of all the ESCs through point-to-point polling communication according to the addresses of all the ESCs.

6. The method according to claim 2, wherein the parameter adjustment system comprises an interactive assembly, and the interactive assembly is configured to display addresses and corresponding parameter information of the ESCs and respond to a user interaction, wherein the user interaction comprises modifying the parameter information of the target ESC according to the address of the target ESC.

7. The method according to claim 2, wherein the updating the common control parameter domain parameters of all the ESCs based on the modified common control parameter domain parameter comprises:
   publishing the modified common control parameter domain parameter on the CAN bus network through broadcast communication, such that all the ESCs acquire and store the modified common control parameter domain parameters through the CAN bus network.

8. The method according to claim 2, wherein the updating the independent control parameter domain parameter of the target ESC based on the modified independent control parameter domain parameter comprises:
   performing point-to-point polling communication between the modified independent control parameter domain parameter and the address of the target ESC to write the independent control parameter domain parameter into the target ESC corresponding to the address, so as to store the corresponding independent control parameter domain parameter in the target ESC.

9. A parameter setting device, applied to a multi-rotor drone, wherein the multi-rotor drone comprises a parameter adjustment system and a plurality of ESCs, the parameter adjustment system is in communication connection with the plurality of ESCs, and the device comprises:
   an ESC identification module, being configured for acquiring identity information of all the ESCs;
   an address parsing module, being configured for parsing parameter information of the ESCs according to the identity information to enable a user to modify parameter information of a target ESC according to the identity information, wherein the parameter information comprises a common control parameter domain parameter and an independent control parameter domain parameter;
   a parameter modification module, being configured for acquiring the common control parameter domain parameter and the independent control parameter domain parameter of the target ESC modified by the user;

a first parameter setting module, being configured for updating the common control parameter domain parameters of all the ESCs based on the modified common control parameter domain parameter; and a second parameter setting module, being configured for updating the independent control parameter domain parameter of the target ESC based on the modified independent control parameter domain parameter.

10. A multi-rotor drone, comprising:

at least one processor and memory; and the memory is coupled to the processor, the memory is configured to store instructions or programs, and when the instructions or programs are executed by at least one processor, the at least one processor executes the parameter setting method according to claim 1.

11. A non-volatile computer-readable storage medium, wherein the non-volatile computer-readable storage medium stores computer-executable instructions, and when the computer-executable instructions are executed by an electronic device, the electronic device executes the parameter setting method according to claim 1.

12. A computer program product, wherein the computer program product comprises a computer program stored on a non-volatile computer-readable storage medium, the computer program comprises program instructions, and when the program instructions are executed by an electronic device, the electronic device executes the parameter setting method according to claim 1.

* * * * *